United States Patent [19]
Yamaguchi et al.

[11] 4,448,042
[45] May 15, 1984

[54] COOLANT SUPPLY AND DISCHARGE DEVICE FOR SUPERCONDUCTIVE ROTOR

[75] Inventors: Kiyoshi Yamaguchi, Hitachi; Naoki Maki, Ibaraki, both of Japan

[73] Assignee: Hitachi, Ltd., Tokyo, Japan

[21] Appl. No.: 437,675

[22] Filed: Oct. 29, 1982

[30] Foreign Application Priority Data

Oct. 31, 1981 [JP] Japan .................. 56-175314

[51] Int. Cl.³ ........................... F25B 31/00
[52] U.S. Cl. ........................ 62/505; 62/55; 310/54; 310/64
[58] Field of Search ............ 62/55, 505, 514 R; 310/54, 64, 52

[56] References Cited

U.S. PATENT DOCUMENTS

| | | | |
|---|---|---|---|
| 3,626,717 | 12/1971 | Lorch | 62/505 |
| 3,760,603 | 9/1973 | Dick | 62/505 |
| 3,845,639 | 11/1974 | Smith, Jr. et al. | 62/505 |
| 4,056,745 | 11/1977 | Eckels | 62/505 |
| 4,079,273 | 3/1978 | Lambrecht | 310/64 |
| 4,101,793 | 7/1978 | Berthet et al. | 310/52 |
| 4,207,745 | 6/1980 | Pouillange | 62/55 |

FOREIGN PATENT DOCUMENTS 53-133710 of 1978 Japan .
54-26411 of 1979 Japan .

*Primary Examiner*—Ronald C. Capossela
*Attorney, Agent, or Firm*—Antonelli, Terry & Wands

[57] ABSTRACT

A coolant supply and discharge device for a superconductive rotor including a gaseous coolant withdrawing tube for withdrawing a gaseous coolant located at an end portion of fixed casing enclosing an end portion of the rotor and supporting a coolant feed tube. The withdrawing tube is constituted to withdraw a predetermined amount of gaseous coolant produced in a clearance between the coolant feed tube and a coolant inlet tube located within a rotor shaft to a coolant sump located outside, to avoid introduction of heat into the feed tube from outside.

2 Claims, 2 Drawing Figures

COOLANT SUPPLY AND DISCHARGE DEVICE FOR SUPERCONDUCTIVE ROTOR

FIELD OF THE INVENTION

This invention relates to a coolant supply and discharge device for a superconductive rotor, and more particularly it is concerned with a coolant supply and discharge device for a superconductive rotors for supplying a coolant in a liquid state to the superconductive rotor and discharging the coolant in a gaseous state after effecting cooling of the superconductive rotor.

DESCRIPTION OF THE PRIOR ART

Generally, in superconductive electrical rotary machines, such as superconductive generators, the revolving-field type offering a multiplicity of advantages is favored.

In this case, the rotor is equipped with a superconductive coil and liquid helium is supplied thereto as a superlow temperature coolant in forced circulation flow, so as to keep the superconductive coil at a superlow temperature level. In the event that a large amount of heat is introduced from outside into the superconductive coil, the liquid helium supplied thereto is vigorously evaporated even if it is supplied in forced circulation flow, with the result that a large amount of liquid helium is required. This inevitably increases the rate of operation of the refrigerating apparatus and the cost for liquidizing the helium. To cope with this problem, it has hitherto been usual practice to lengthen the liquid helium passageway extending through the rotor shaft or to provide a heat insulating section to lessen the amount of heat transferred to the superconductive coil.

However, difficulties have been faced with to insulate heat satisfactorily. A coolant (helium) supply and discharge device of the conventional construction will be described hereunder.

Figure 1:
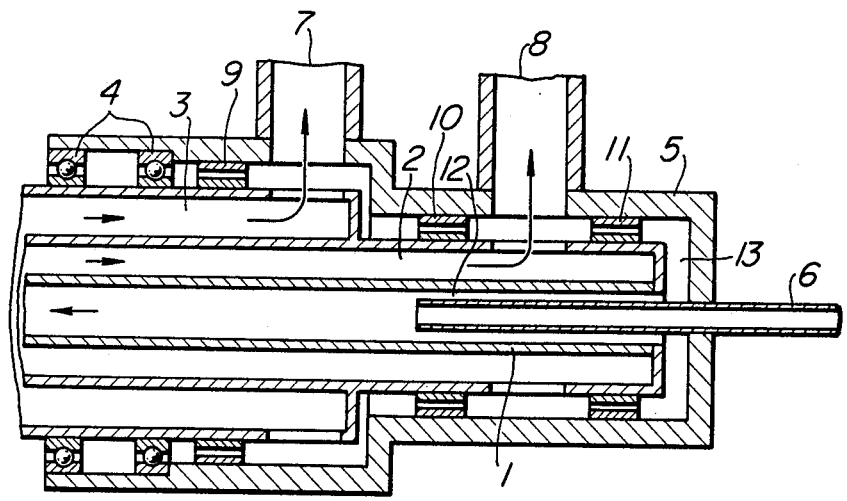
FIG. 1 is vertical sectional side view of a coolant supply and discharge device for a superconductive rotor of the prior art.

FIG. 1 shows a conventional coolant supply and discharge device for a superconductive rotor. The coolant supply and discharge device which is mounted at an end portion of the superconductive rotor, not shown, comprises an inlet tube 1 for introducing a coolant in a liquid state into the rotor, an inner discharge tube 2 and an outer discharge tube 3 located at the outer periphery of the inlet tube 1 for recovering the coolant in a gaseous state, a fixed casing 5 located at the outer periphery of the outer discharge line 3 through bearings 4 in a manner to enclose the inlet tube and inner and outer discharge tubes 2 and 3, and a feed tube 6 extending into the casing 5 and having one open end portion located in the inlet tube 1 for feeding the liquid coolant thereinto. The liquid coolant is introduced into the inlet tube 1 through the feed tube 6 from a coolant supply and discharge section, not shown, located outside the rotor. The liquid coolant thus supplied is fed from the inlet tube 1 into the rotor to cool the same, and the coolant changed to a gaseous state after effecting cooling is discharged from the rotor into the coolant supply and discharge section through the outer discharge tube 3 and inner discharge tube 2 and outlet pipes 7 and 8 connected to the outer periphery of the casing 5 and communicated with the outer and inner discharge tubes 3 and 2 respectively. The system for supplying liquid coolant and discharging gaseous coolant including the outer discharge tube 3 and outlet pipe 7, the inner discharge tube 2 and outlet pipe 8, and the feed tube 6 and inlet tube 1 are kept airtight with respect to each other and the atmosphere by seals 9, 10 and 11 mounted in predetermined positions.

In the coolant supply and discharge device of the aforesaid construction, a clearance 12 is defined between the feed tube 6 and the inlet tube 1 to allow the inlet tube 1 which is a rotary part to rotate relative to the feed tube 6 which is a fixed part. Gaseous coolant produced by vaporization of part of the liquid coolant supplied through the feed tube 6 exists in the clearance 123. The gaseous coolant in this clearance is caused to flow in circulation by heat transferred from outside through the fixed casing 5, so that the gaseous coolant causes so-called convection flow in the clearance 12. When such conversion flow is produced, heat is led into the feed tube 6 and a heat loss is produced at the end portion of the feed tube 6, with the result that the liquid content of the coolant supplied decreases and efficiency is reduced in cooling the rotor. The amount of heat led into the feed tube 1 by the convection flow of the gaseous coolant in the clearance 12 is proportional to the ninth power of the size of the clearance 12. Thus the device is designed and manufactured to minimize the clearance 12. However, difficulties are experienced in reducing the size of the clearance 12 when the machine is large in size, because of the fact that rotation of the inlet tube 1 produces vibration of high order and the inlet tube 1 is brought into contact with the feed tube 6 if the size of the clearance 12 is reduced to meet the requirement of minimizing the amount of heat led into the clearance 12. To avoid contact between the inlet tube 1 and feed tube 6, it is required to increase the size of the clearance 12. Thus, the amount of heat introduced into the feed tube 6 is disadvantageously increased. In FIG. 1, numeral 13 designates a space in the fixed casing 5 in comminication with the clearance 12 or the inlet tube 1.

SUMMARY OF THE INVENTION

This invention has been developed for the purpose of obviating the aforesaid problem which the prior art is faced with. Accordingly the invention has as its object the provision of a coolant supply and discharge device for a superconductive rotor capable of avoiding the introduction of heat into the feed tube through convection.

The outstanding characteristic of the invention is that the coolant supply and discharge device is provided with withdrawing means located at an end portion of the fixed casing for withdrawing from the clearance between the feed tube and the inlet tube a predetermined amount of coolant in a gaseous state produced therein through a space in the fixed casing communicated with the inlet tube to a coolant sump located outside the fixed casing.

DESCRIPTION OF THE PREFERRED EMBODIMENT

Figure 2:
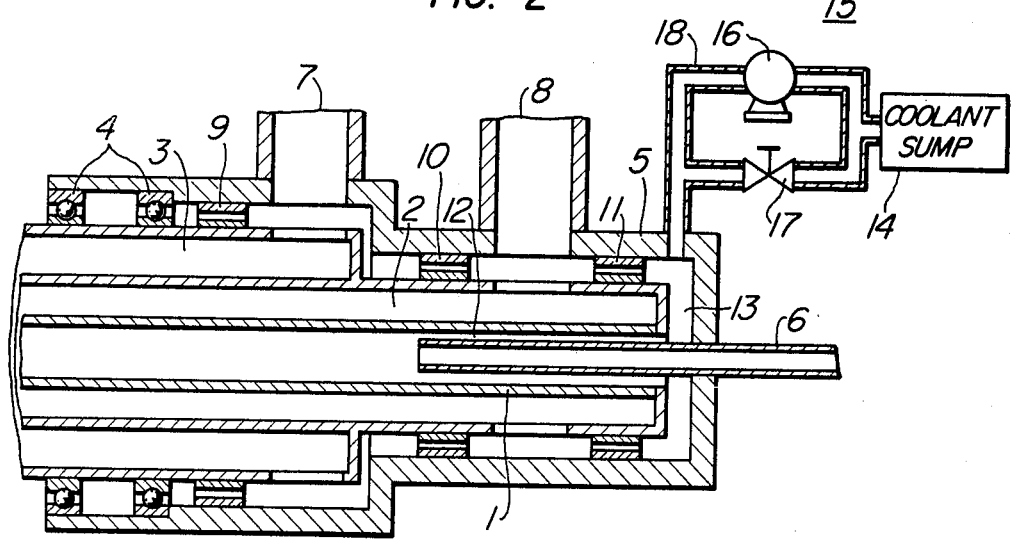
FIG. 2 is a vertical sectional side view of the coolant supply and discharge device for a superconductive rotor in accordance with an embodiment of the invention.

The invention will now be described by referring to an embodiment shown in the drawing. FIG. 2 shows one embodiment in which parts similar to those of the device of the prior art shown in FIG. 1 are designated by like reference characters. According to the invention, there is provided withdrawing means 15 for withdrawing a predetermined amount of gaseous coolant produced in the clearance 12 between the feed tube 6 and the inlet tube 1, through the space 13 in the fixed casing 5 communicated with the inlet tube 1, to a coolant sump 14 located outside the fixed casing 5. The withdrawing means 15 comprises a gaseous coolant withdrawing tube 18 connecting the end portion of the fixed casing 5 communicated with the space 13 in the fixed casing 5 to the coolant sump 14 and having a pump 16 and a flow resistance adjusting valve 17 mounted in parallel with each other. By virtue of this structural feature, it is possible, when the pressure at the end portion of the feed tube 6 is low (below atmospheric pressure), to withdraw, by actuating the pump 16, from the clearance 12 between the feed tube 6 and the inlet tube 1 a predetermined (required) amount of gaseous coolant produced therein to the coolant sump 14 via the space 13 in the fixed casing 5 and through the withdrawing tube 18. Conversely, when the pressure at the end portion of the feed tube 6 is high (over atmospheric pressure), it is possible to withdraw, by rendering the pump 16 inoperative the flow resistance adjusting valve 17, the predetermined amount of gaseous coolant through the valve 17 to the coolant sump 14. Thus the gaseous coolant produced in the clearance 12 between the inlet tube 6 and the supply tube 1 can be withdrawn in predetermined amount to the coolant sump 14, so that a flow of the gaseous coolant directed to the withdrawing tube 18 is produced in the clearance 12 between the feed tube 6 and the inlet tube 1 and no convection is produced. This is conductive to prevention of heat being introduced into the feed tube 6 on account of production of convection and of a heat loss occurring at the end portion of the feed tube 6. It is to keep the liquid coolant supplied from the feed tube 6 to the inlet tube 1 from being withdrawn to the coolant sump 14 that the gaseous coolant is withdrawn under control in predetermined amount.

From the foregoing description, it will be appreciated that according to the invention means is provided for withdrawing a predetermined amount of gaseous coolant from the clearance between the feed tube and the inlet tube in which it is produced. thus a flow of the gaseous coolant directed to the withdrawing tube of the withdrawing means is produced in the clearance between the feed tube and the inlet tube by the flow of gaseous coolant withdrawn in predetermined amount, so that no convection flow is produced and introduction of heat into the feed tube on account of convection flow is avoided.

What is claimed is:

1. A coolant supply and discharge device for a superconductive rotor comprising:
    an inlet tube connected to an end portion of the superconductive rotor to introduce a coolant in a liquid state into said superconductive rotor;
    an inner discharge tube and an outer discharge tube located at the outer periphery of said inlet tube to recover the coolant in a gaseous state;
    a fixed casing located at the outer periphery of said outer discharge tube through bearings in a manner to enclose said inlet tube and said inner and outer discharge tubes;
    a feed tube extending into said fixed casing and having an open end portion located in said inlet tube to feed the coolant in the liquid state into the inlet tube; and
    withdrawing means located at an end portion of said fixed casing to withdraw a predetermined amount of gaseous coolant produced in a clearance between said feed tube and said inlet tube to a coolant sump located outside said fixed casing through a space in said fixed casing communicating with said inlet tube.

2. A coolant supply and discharge device for a superconductive rotor as claimed in claim 1, wherein said withdrawing means comprises a gaseous coolant withdrawing tube located betwen the end portion of said fixed casing communicating with said space in said fixed casing and said coolant sump and having a sump and a flow resistance adjusting valve connected in parallel with each other.

* * * * *